(12) United States Patent
Nagaoka et al.

(10) Patent No.: US 8,827,227 B2
(45) Date of Patent: Sep. 9, 2014

(54) DISPLAY DEVICE TURNING BASE

(75) Inventors: Yoshiki Nagaoka, Tokyo (JP);
Katsutoshi Okada, Tokyo (JP); Naoki Asakura, Tokyo (JP); Norio Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 462 days.

(21) Appl. No.: 12/414,302

(22) Filed: Mar. 30, 2009

(65) Prior Publication Data
US 2009/0261223 A1 Oct. 22, 2009

(30) Foreign Application Priority Data

Apr. 17, 2008 (JP) ................. 2008-107496

(51) Int. Cl.
*A47B 91/00* (2006.01)
*F16M 11/08* (2006.01)
*F16M 11/20* (2006.01)
*F16M 11/10* (2006.01)
*F16M 11/18* (2006.01)

(52) U.S. Cl.
CPC ........... *F16M 11/08* (2013.01); *F16M 11/2014* (2013.01); *F16M 11/10* (2013.01); *F16M 2200/08* (2013.01); *F16M 11/18* (2013.01); *Y10S 248/917* (2013.01); *Y10S 248/923* (2013.01)
USPC .... 248/349.1; 248/917; 248/923; 248/346.01

(58) Field of Classification Search
CPC ...................................... A47B 95/00
USPC .............. 248/349.1, 917, 918, 919, 920, 921, 248/922, 923, 346.01, 121, 125.9, 126, 127, 248/130, 131, 133, 137, 139, 144, 371
See application file for complete search history.

(56) References Cited

U.S. PATENT DOCUMENTS 4,564,166 A * 1/1986 Craft et al. ................. 248/179.1
4,570,892 A 2/1986 Czech et al.
(Continued)

FOREIGN PATENT DOCUMENTS

JP 59-126279 U 8/1984
JP 4-61576 A 2/1992
(Continued)

*Primary Examiner* — Terrell McKinnon
*Assistant Examiner* — Monica Millner
(74) *Attorney, Agent, or Firm* — Birch, Stewart, Kolasch & Birch, LLP

(57) ABSTRACT

The present invention is to provide an electric display device turning base capable of stabilizing and turning a direction of a thin-screen display device. This display device turning base is provided with a first base portion; a mounting and fixing portion; a pair of arc guide rails installed in the mounting and fixing portion in such a manner that a center point of an arc thereof is arranged on a horizontal line passing through a gravity center of the thin-screen display device mounted and fixed to the mounting and fixing portion and extending in a left and right direction; a support roller for supporting the arc guide rails turnably around the horizontal line in a state that the center point of the arc guide rails is arranged on the horizontal line, the support roller being rotatably installed in the first base portion in a standing manner; and an electric drive mechanism for turning the arc guide rails around the horizontal line.

5 Claims, 17 Drawing Sheets

(56) References Cited

U.S. PATENT DOCUMENTS

| | | | |
|---|---|---|---|
| 4,690,362 A | 9/1987 | Helgeland | |
| 4,858,864 A * | 8/1989 | Thompson | 248/176.3 |
| 5,037,050 A * | 8/1991 | Lin et al. | 248/179.1 |
| 5,353,142 A * | 10/1994 | Dodd | 349/187 |
| 5,683,068 A * | 11/1997 | Chase et al. | 248/371 |
| 5,791,621 A | 8/1998 | Yashima | |
| 5,881,985 A * | 3/1999 | Hoenig | 248/371 |
| 6,007,038 A * | 12/1999 | Han | 248/371 |
| 6,024,336 A * | 2/2000 | Lin et al. | 248/371 |
| 6,102,355 A * | 8/2000 | Rood | 248/425 |
| 6,105,919 A * | 8/2000 | Min | 248/418 |
| 6,116,560 A * | 9/2000 | Kim | 248/371 |
| 6,227,518 B1 * | 5/2001 | Sun | 248/371 |
| 6,766,994 B2 * | 7/2004 | Serbinski et al. | 248/371 |
| 6,869,056 B2 * | 3/2005 | Tsukuda | 248/371 |
| 7,424,994 B2 * | 9/2008 | Jeong | 248/278.1 |
| 7,438,269 B2 * | 10/2008 | Pfister et al. | 248/292.14 |
| 7,506,853 B2 * | 3/2009 | Sweere et al. | 248/295.11 |
| 7,540,463 B2 * | 6/2009 | Tsuboi | 248/393 |
| 7,817,410 B2 * | 10/2010 | Sawai | 361/679.22 |
| 7,950,610 B2 * | 5/2011 | Sawai | 248/131 |
| 8,157,237 B2 * | 4/2012 | Sawai et al. | 248/349.1 |
| 8,237,874 B2 * | 8/2012 | Yokota et al. | 348/827 |
| 2004/0011938 A1 * | 1/2004 | Oddsen, Jr. | 248/393 |
| 2005/0263659 A1 * | 12/2005 | Pfister et al. | 248/289.11 |
| 2007/0176067 A1 * | 8/2007 | Monaco | 248/284.1 |
| 2008/0111929 A1 * | 5/2008 | Yokota et al. | 348/836 |
| 2008/0149800 A1 * | 6/2008 | Katsumata et al. | 248/349.1 |
| 2008/0272262 A1 * | 11/2008 | Katsumata et al. | 248/349.1 |

FOREIGN PATENT DOCUMENTS

| | | |
|---|---|---|
| JP | 8-289229 A | 11/1996 |
| JP | 2002-265189 A | 9/2002 |
| JP | 2004-304679 A | 10/2004 |

* cited by examiner

F I G. 1
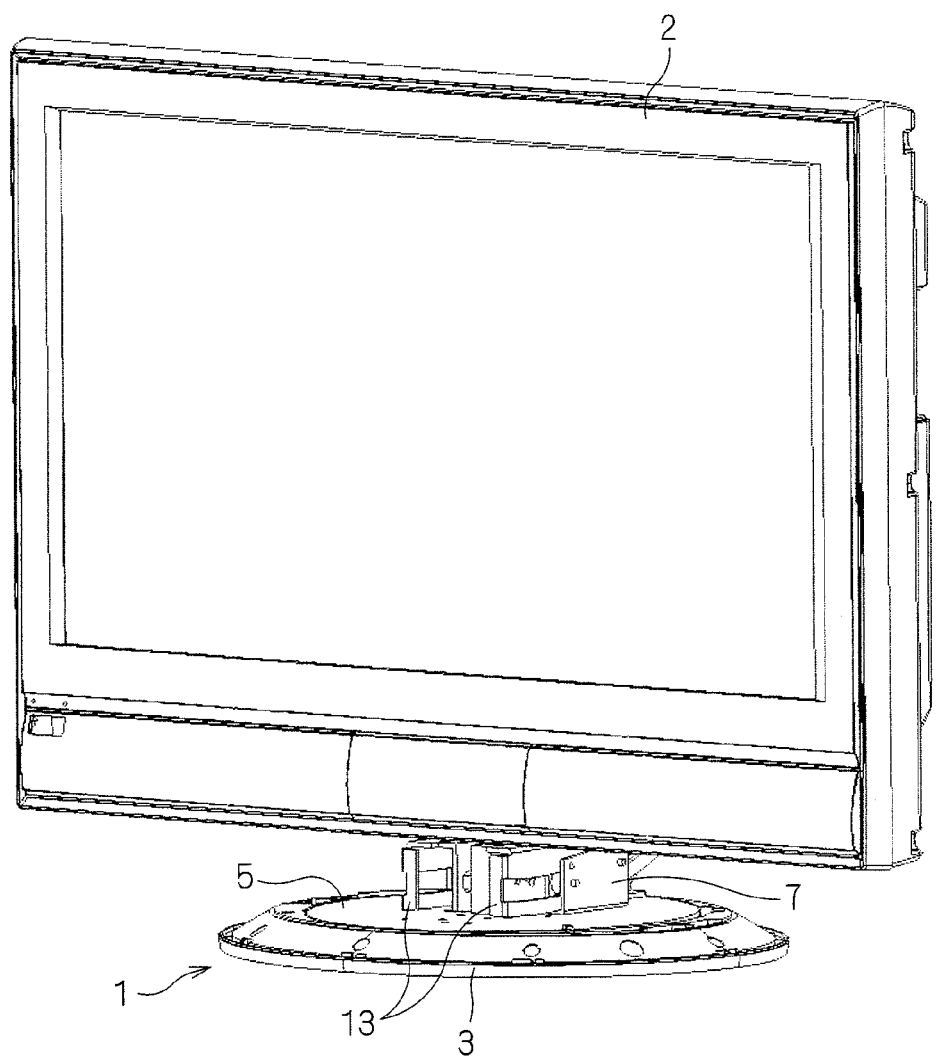

F I G. 2
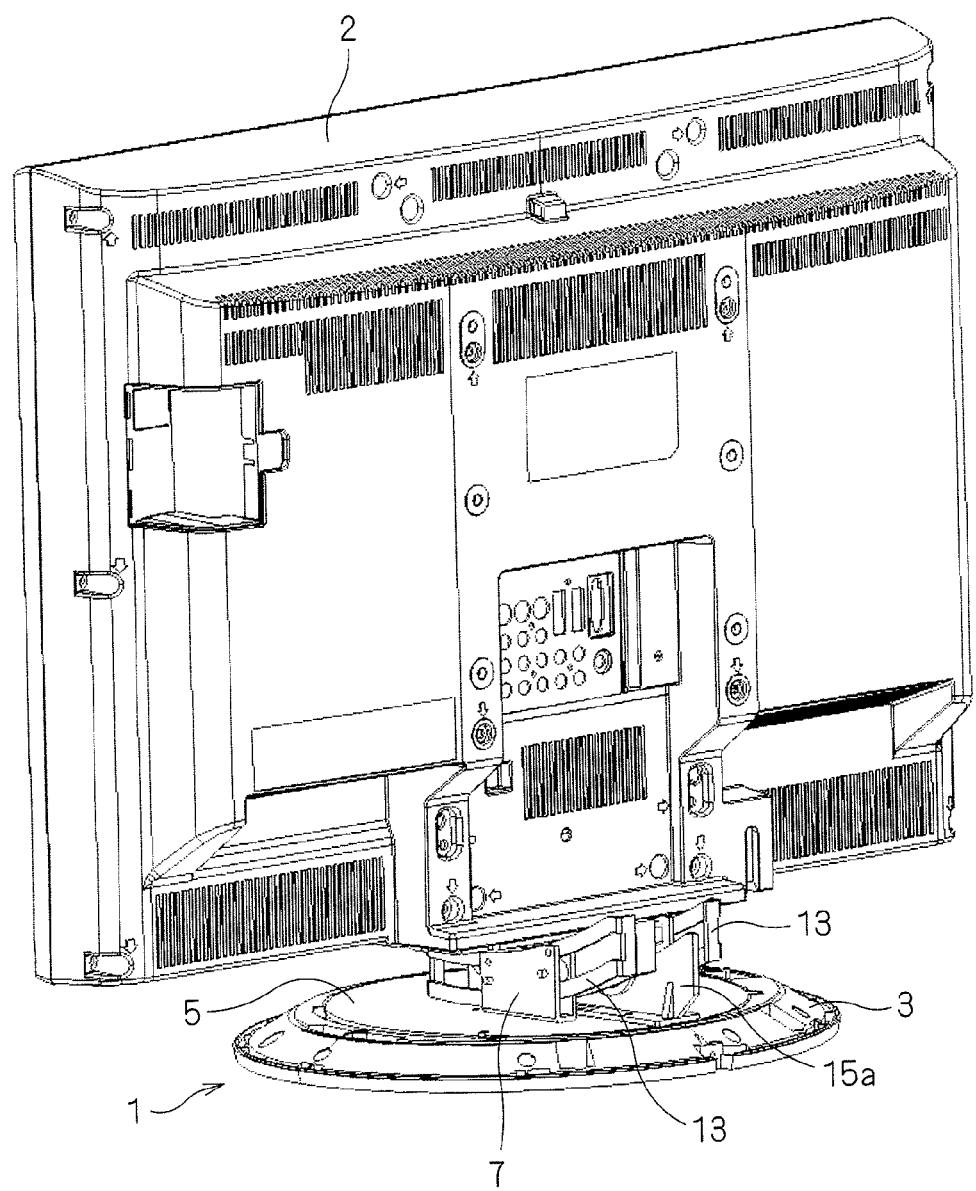

F I G . 4
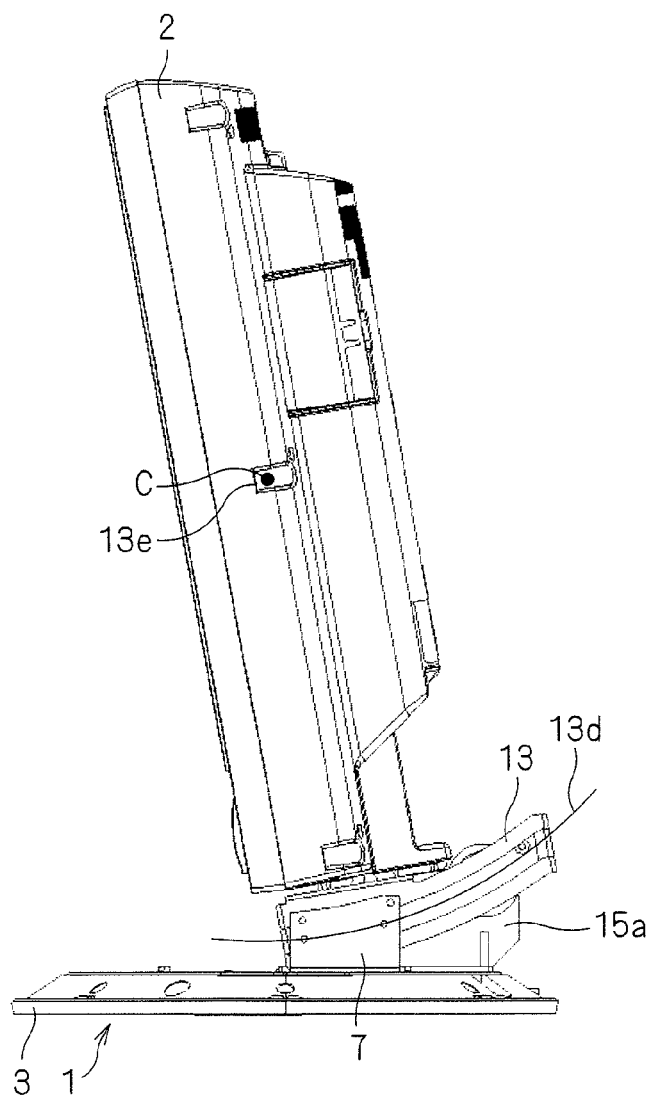

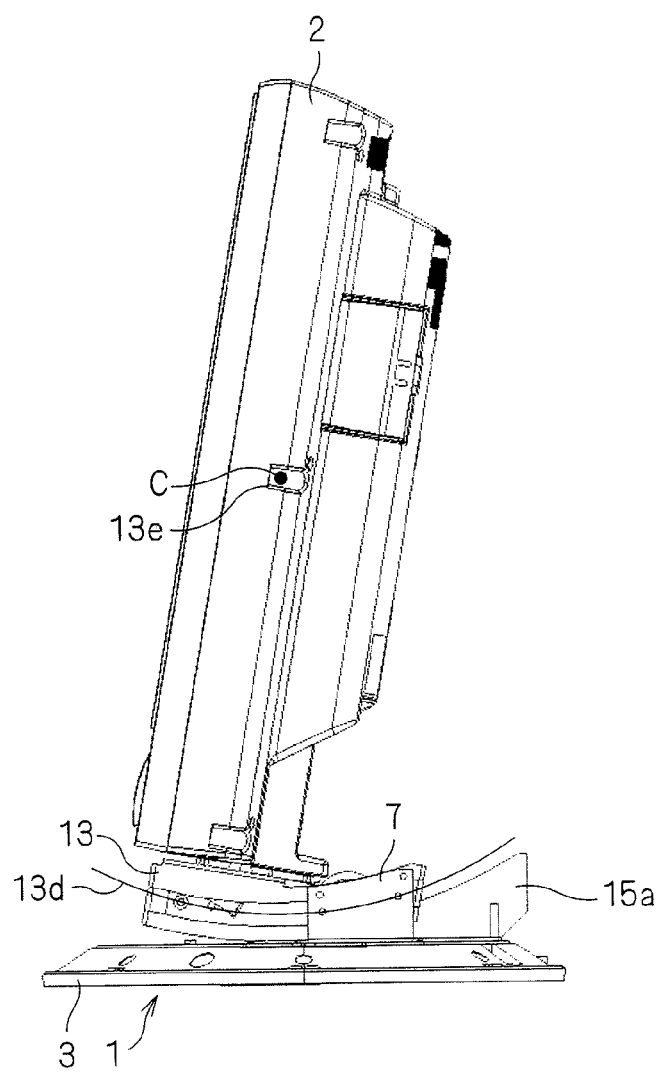
F I G. 5

F I G. 6
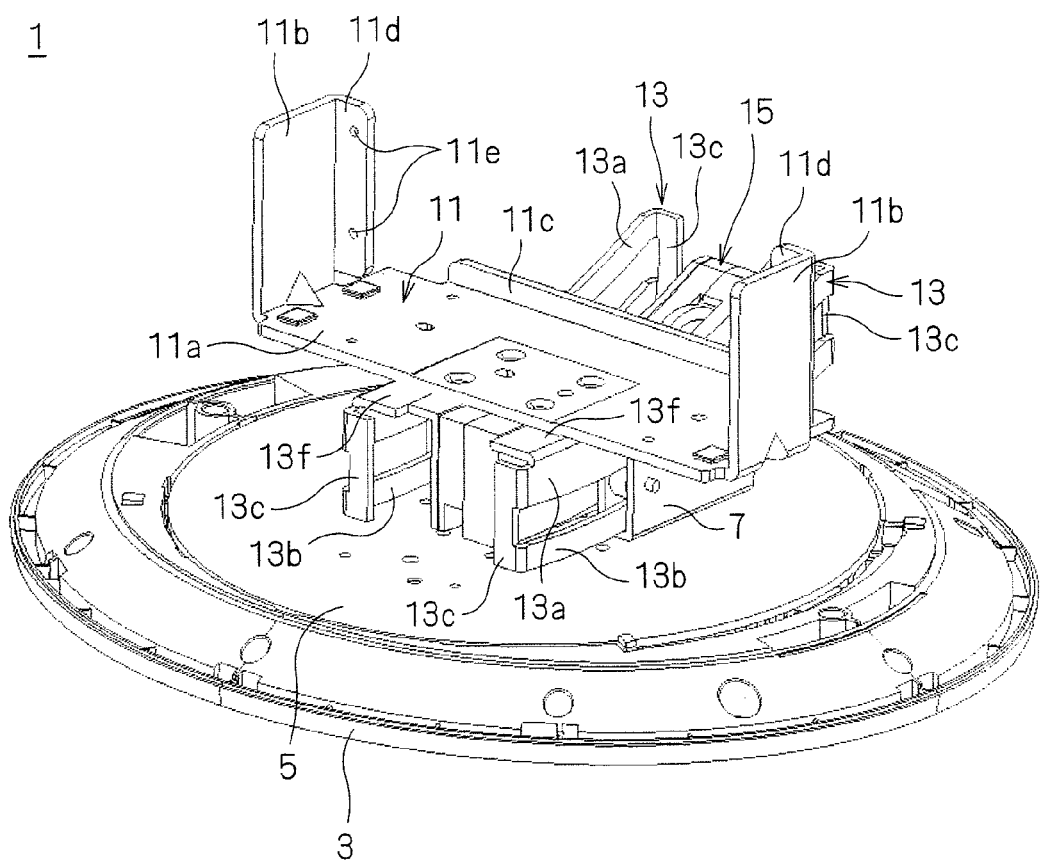

DISPLAY DEVICE TURNING BASE

BACKGROUND OF THE INVENTION

1. Field of the Invention

The present invention relates to a display device turning base for electrically adjusting a direction of a thin-screen display device such as a liquid crystal display device.

2. Description of the Background Art

In a conventional display device turning base for a thin-screen display device, a standing portion is disposed on a base portion in a standing manner, a support portion is installed in an upper part of the standing portion turnably leftward and rightward in a state that the support portion protrudes forward, a front end of the support portion is installed in a back surface of the thin-screen display device turnably backward and forward. By this configuration, a direction of the thin-screen display device can be turned backward, forward, leftward and rightward by hand.

However, with such a configuration, in the case where the direction of the thin-screen display device is electrically turned backward and forward, a gravity center position of the thin-screen display device is not fixed, and thus the gravity center is moved at the time of turning. Therefore, there is a problem that the display device cannot be stably turned.

When the gravity center position of the thin-screen display device is not fixed, rotation moment due to a gravity center around a rotation axis thereof is changed at the time of turning and necessary drive force is changed. Therefore, speed of the rotation is not constant, and thus there is also a problem that the display device cannot be stably turned.

It should be noted that Japanese Patent Application Laid-Open No. 4-61576 is disclosed as a related art of a display device turning base for electrically turning the direction of the display device backward, forward, leftward and rightward.

However, Japanese Patent Application Laid-Open No. 4-61576 is to be applied to a CRT display device and does not disclose a point that a gravity center position of the display device is fixed.

Even when the CRT display device is turned backward and forward, the gravity center is not radically changed and thus there is no problem. However, when a gravity center position of a thin-screen display device is not fixed and the thin-screen display device is turned backward and forward, the gravity center position is largely changed and thus the thin-screen display device cannot be stably turned. Therefore, even when the display device turning base of Japanese Patent Application Laid-Open No. 4-61576 is applied to the thin-screen display device, there is a problem that the thin-screen display device cannot be stably turned backward and forward.

SUMMARY OF THE INVENTION

An object of the present invention is to provide an electric display device turning base capable of stably turning a direction of a thin-screen display device.

A first aspect of the present invention includes a first base portion; a mounting and fixing portion to which a display device is mounted and fixed; a pair of left and right arc guide rails installed in the mounting and fixing portion in such a manner that a center point of an arc thereof is arranged on a horizontal line passing through a gravity center of a thin-screen display device mounted and fixed to the mounting and fixing portion and extending in a left and right direction; a support roller for supporting the arc guide rails turnably around the horizontal line in a state that the center point of the arc guide rails is arranged on the horizontal line, the support roller being rotatably installed in a standing portion disposed in the first base portion in a standing manner; and an electric drive mechanism for turning the arc guide rails around the horizontal line so as to turn the mounting and fixing portion backward and forward.

According to the first aspect of the present invention, the arc guide rails are supported turnably around the horizontal line in a state that the center point of the arcs is arranged on the horizontal line passing through the gravity center of the thin-screen display device mounted and fixed to the mounting and fixing portion and extending in the left and right direction. Therefore, the thin-screen display device can be turned backward and forward in a state that the gravity center position of the thin-screen display device mounted and fixed to the mounting and fixing portion is fixed. Thereby, it is possible to stabilize and turn the thin-screen display device backward and forward.

The arc guide rails are turned around the horizontal line by the electric drive mechanism so as to turn the mounting and fixing portion backward and forward. Therefore, it is possible to electrically stabilize and turn the thin-screen display device mounted and fixed to the mounting and fixing portion backward and forward.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view from a front oblique direction when a display device 2 is installed in a display device turning base 1 according to a first embodiment.

FIG. 2 is a perspective view from a backward oblique direction when the display device 2 is installed in the display device turning base 1 according to the first embodiment.

FIG. 4 is a side view for a forward turn state of the display device 2 when the display device 2 is installed in the display device turning base 1 according to the first embodiment.

FIG. 5 is a side view for a backward turn state of the display device 2 when the display device 2 is installed in the display device turning base 1 according to the first embodiment.

FIG. 6 is a perspective view from the front oblique direction of the display device turning base 1 according to the first embodiment.

FIG. 12 is a view showing a meshing state between a drive gear 15j of the gear box 15b and an arc internal gear 15a.

DESCRIPTION OF THE PREFERRED EMBODIMENTS

First Embodiment

Figure 3:
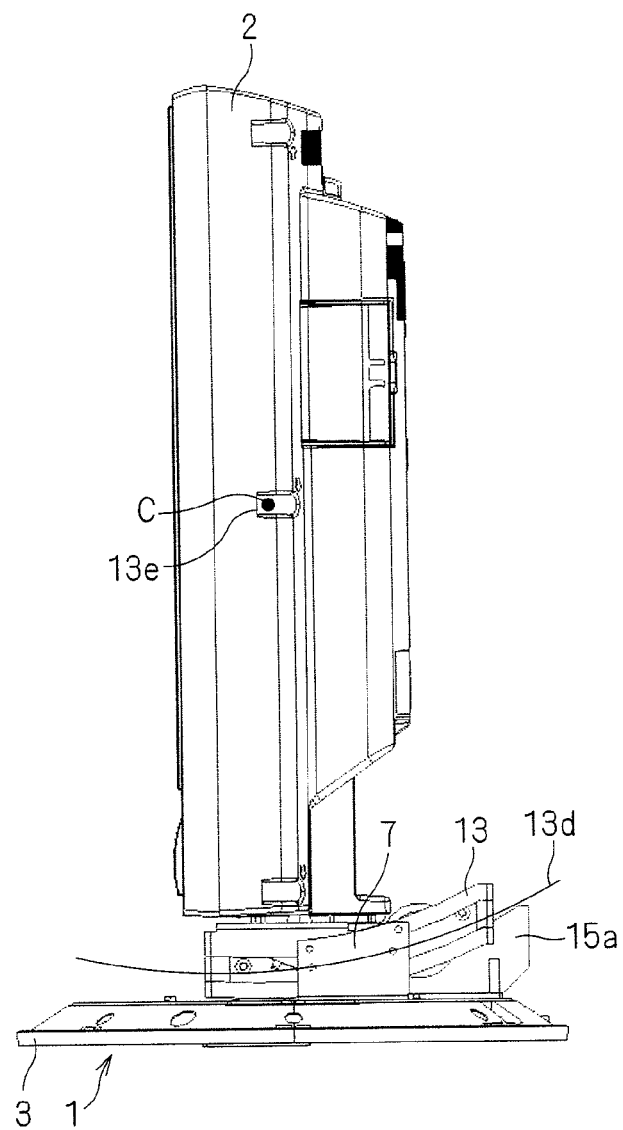
FIG. 3 is a side view for a neutral position state of backward and forward turn of the display device 2 when the display device 2 is installed in the display device turning base 1 according to the first embodiment.

A display device turning base 1 according to this embodiment is an electric display device turning base for turning a direction of a thin-screen display device such as a liquid crystal display device backward, forward, leftward and rightward. As in FIGS. 1 to 7, the display device turning base 1 is provided with a platform base 3 formed in a round shape for example, a rotating base (a first base portion) 5 horizontally rotatably installed on the platform base 3 and formed in a round shape for example, a standing portion 7 disposed on the rotating base 5 in a standing manner, a support roller 9 rotatably installed in the standing portion 7, an mounting and fixing portion 11 to which a thin-screen display device 2 is mounted and fixed, an arc guide rail 13 installed in the mounting and fixing portion 11 and supported by the support roller 9, and an electric drive mechanism 15 for turning the mounting and fixing portion 11 backward and forward.

A recess portion in a round shape in plan is formed in a center on an upper surface of the platform base 3, and the rotating base 5 is installed in the recess portion horizontally rotatably.

The platform base 3 is provided with an arc rack installed on a bottom surface of the recess portion of the platform base 3 so as to face a peripheral edge of a lower surface of the rotating base 5, a first electric motor installed on the lower surface of the rotating base 5, and a gear installed in a drive shaft of the first electric motor and meshed with the arc rack for example (all not shown) as an electric drive mechanism for horizontally rotating the rotating base 5. In other words, the gear is rotated by drive and rotation of the first electric motor and rolled on the arc rack so that the rotating base 5 is rotated horizontally relative to the platform base 3.

Figure 8:
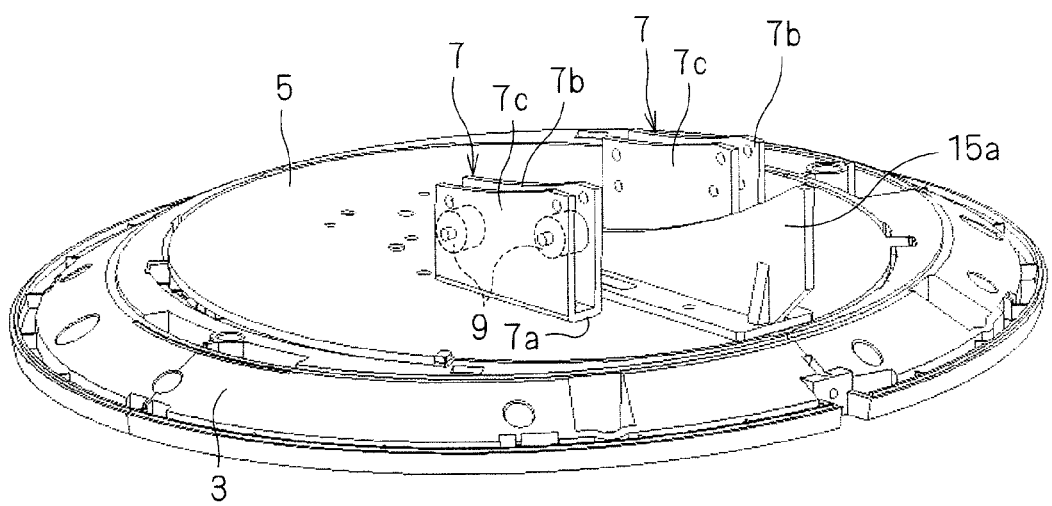
FIG. 8 is a partially perspective view of a side of a platform base 3 in FIG. 6.

As shown in FIG. 8, a pair of left and right standing portions 7 is installed spaced apart from each other on the rotating base 5. A section of each of the standing portion 7 is formed into a U shape for example. In other words, the standing portion 7 has a thin and long rectangular bottom plate portion 7a, and two perpendicular plate portions 7b and 7c are perpendicularly extended on the bottom plate portion 7a along a longitudinal direction of the bottom plate portion 7a so as to be opposed spaced apart from each other. Two or more support rollers (two support rollers here) 9 are installed rotatably around horizontal axes between the perpendicular plate portions 7b and 7c of the standing portion 7.

Figure 9:
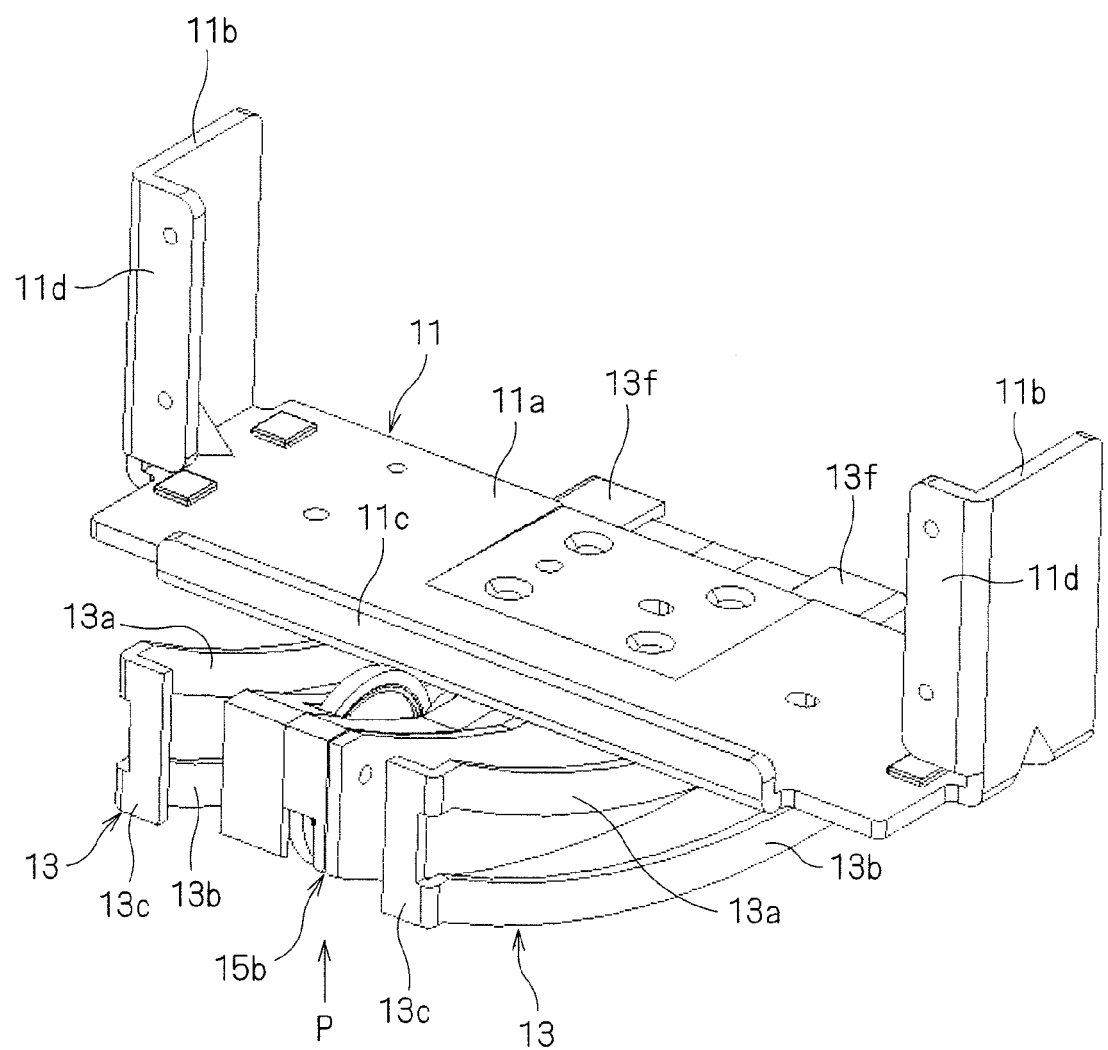
FIG. 9 is a partially perspective view of a side of a mounting and fixing portion 11 in FIG. 6.

The mounting and fixing portion 11 has a mounting portion 11a on which the thin-screen display device 2 is mounted as in FIGS. 6 and 9. Perpendicular plate portions 11b for positioning the left and right of the thin-screen display device 2 are perpendicularly extended on left and right sides of the mounting portion 11a. A protruding strip portion 11c for positioning the front and back of the thin-screen display device 2 is formed on a back side of the mounting portion 11a. A fixing plate 11d fixed with the thin-screen display device 2 is formed on a back side of the perpendicular plate portion 11b, and a hole portion 11e for screwing the thin-screen display device 2 is formed in the fixing plate 11d.

Figure 10:
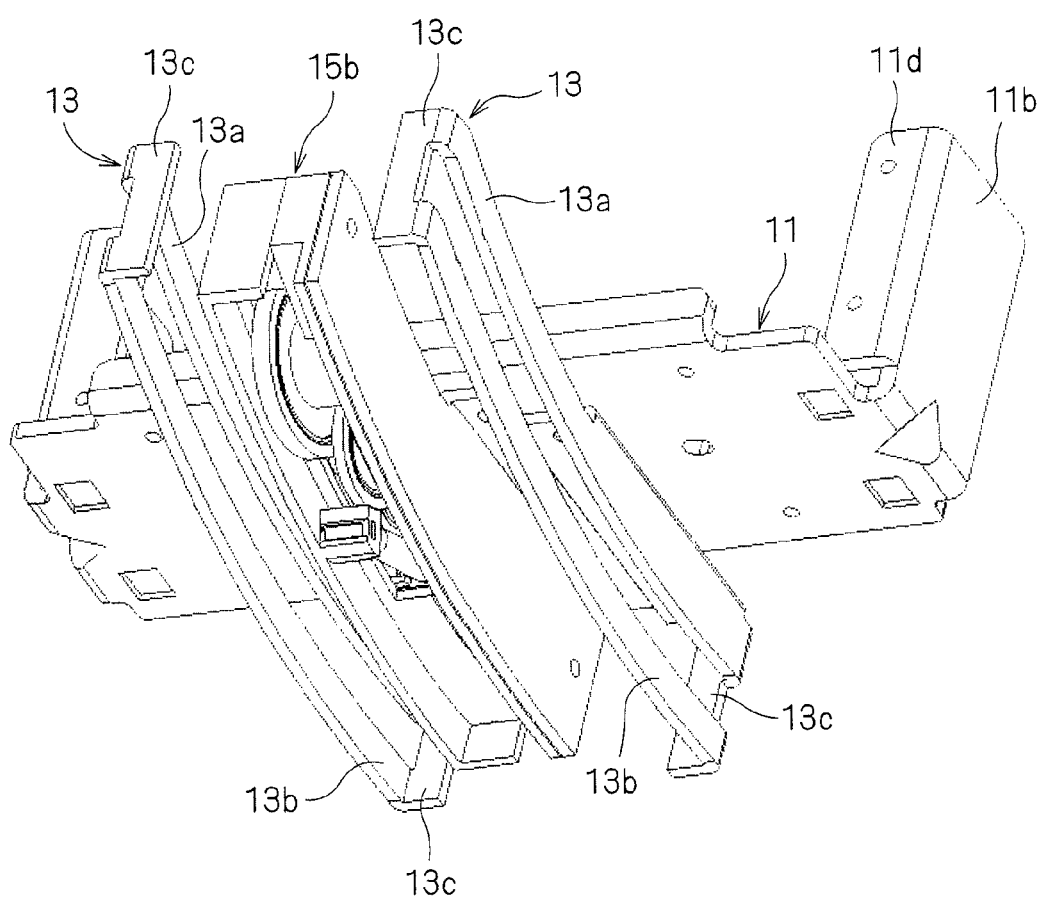
FIG. 10 is a perspective view from an arrow P direction in FIG. 9.

As shown in FIGS. 6, 9 and 10, a pair of left and right arc guide rails 13 is installed in a lower surface of the mounting and fixing portion 11 spaced apart from each other in such a manner that arcs thereof are placed on the lower side. The arc guide rail 13 is formed by an arc upper side portion 13a, an arc lower side portion 13b, a pair of coupling portions 13c for coupling both ends of the side portions 13a and 13b in such a manner that the side portions 13a and 13b are arranged in parallel spaced apart from each other, and a fixing portion 13f formed in the arc upper side portion 13a for fixing the mounting and fixing portion 11. The coupling portions 13c also function as a stopper for preventing the support rollers 9 from dropping off. Here, the arc guide rail 13 is integrally made from one metal plate.

As shown in FIG. 3, the fixing portion 13f of the arc guide rail 13 is installed in the lower surface of the mounting and fixing portion 11 in such a manner that a center point 13e of an arc 13d thereof is arranged on a horizontal line C passing through a gravity center of the thin-screen display device 2 mounted and fixed to the mounting and fixing portion 11 and extending in the left and right direction (the perpendicular direction to a plane of paper).

Figure 7:
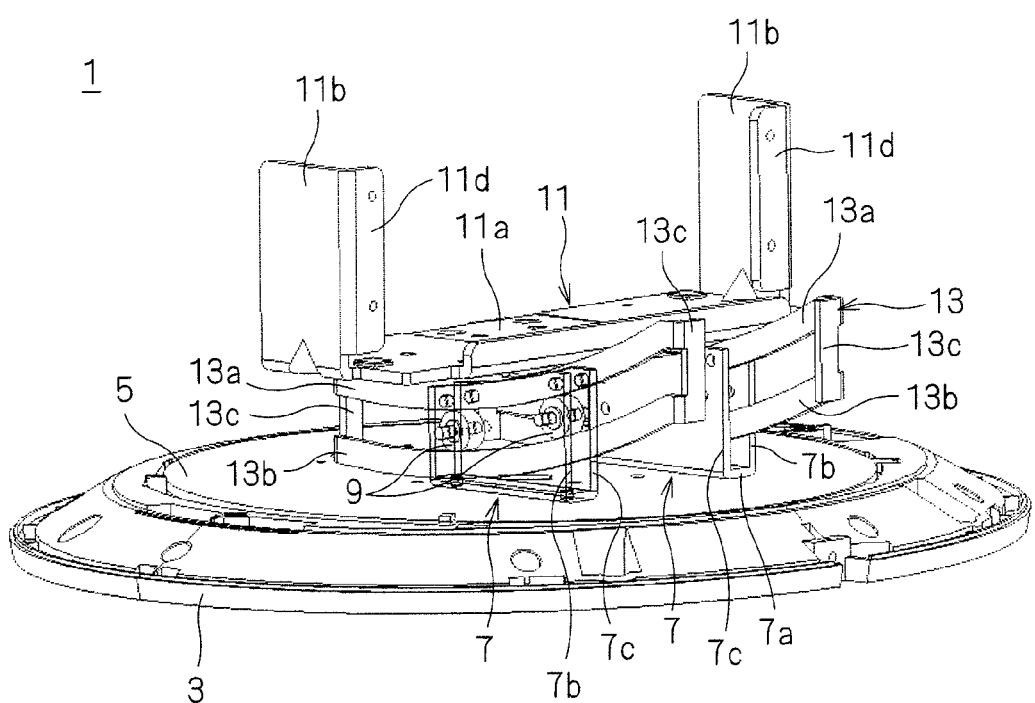
FIG. 7 is a perspective view from the backward oblique direction of the display device turning base 1 according to the first embodiment.

As shown in FIG. 7, the support rollers 9 of one standing portion 7 are arranged between the side portions 13a and 13b of one arc guide rail 13 so as to move along the side portions 13a and 13b. The support rollers 9 of the other standing portion 7 are arranged between the side portions 13a and 13b of the other arc guide rail 13 so as to move along the side portions 13a and 13b.

According to this configuration, as shown in FIGS. 3 to 5, the arc guide rail 13 is supported turnably around the horizontal line C by the support rollers 9 installed in the standing portion 7 in a state that the center point 13e of the arc 13d is arranged on the horizontal line C.

The electric drive mechanism 15 is provided with an arc internal gear 15a installed on the rotating base 5 and a gear box 15b installed in the lower surface of the mounting and fixing portion 11. The arc internal gear 15a is installed between the standing portions 7 for example.

Figure 11:
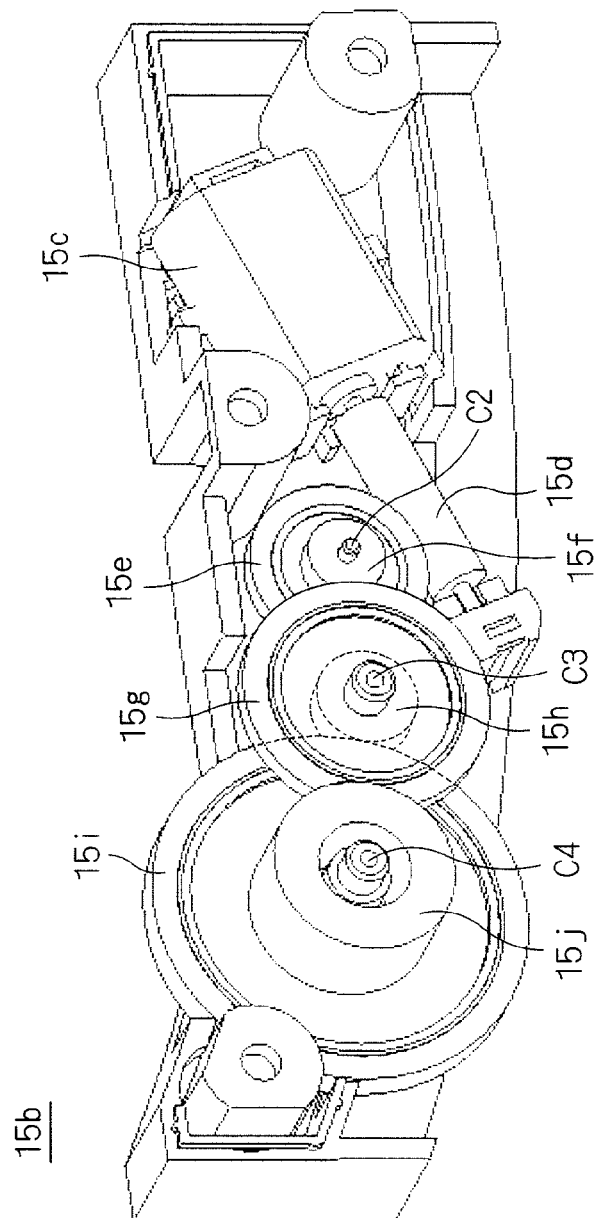
FIG. 11 is a transparent view of a gear box 15b in FIG. 6.

As shown in FIG. 11, the gear box 15b is provided with a second electric motor 15c, a worm gear 15d, a worm wheel 15e, first to fourth relay gears 15f to 15i, and a drive gear 15j.

The worm gear 15d is installed in a rotation axis of the second electric motor 15c. The worm wheel 15e and the first relay gear 15f are coupled to each other and installed rotatably around a rotation axis C2. The second relay gear 15g and the third relay gear 15h are coupled to each other and installed rotatably around a rotation axis C3. The fourth relay gear 15i and the drive gear 15j are coupled to each other and installed rotatably around a rotation axis C4.

Figure 12:
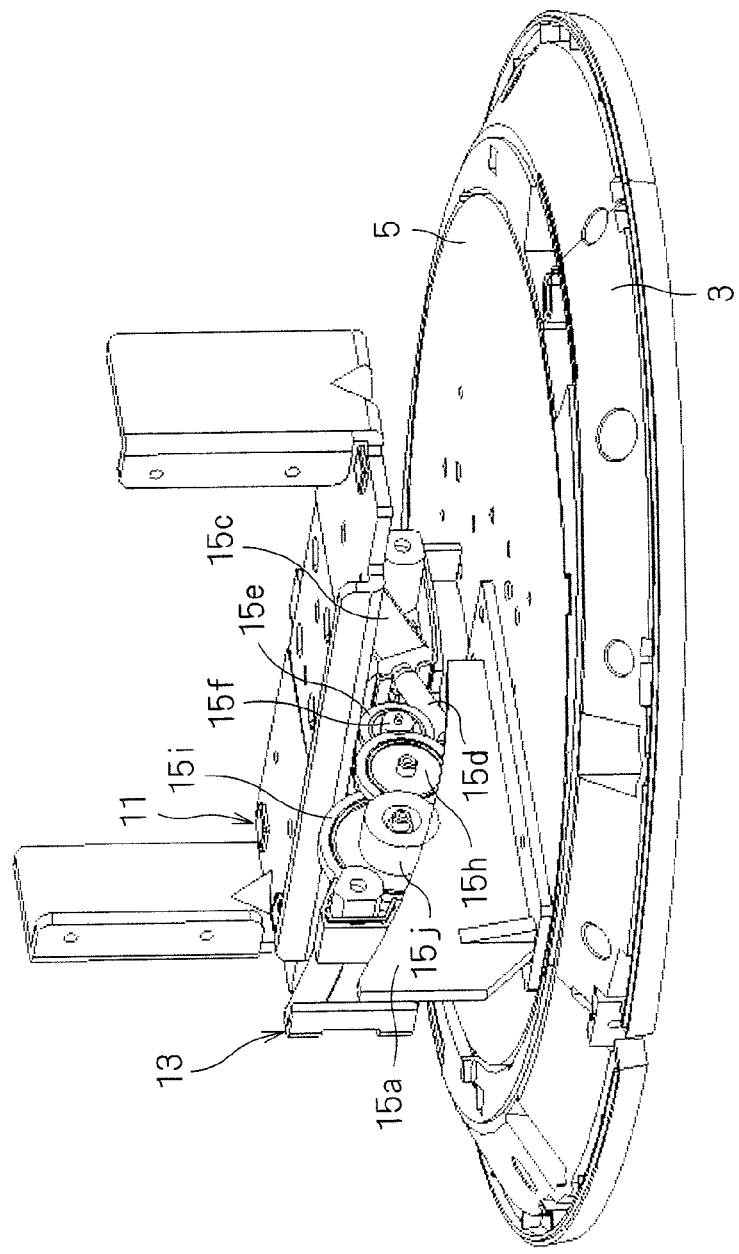

As shown in FIG. 12, the worm gear 15d is meshed with the worm wheel 15e, the first relay gear 15f is meshed with the second relay gear 15g, and the third relay gear 15h is meshed with the fourth relay gear 15i. As shown in FIG. 12, the drive gear 15j is meshed with the arc internal gear 15a.

Here, the worm gear 15d is rotatable by rotation of the worm wheel 15e. In other words, a lead angle of the worm gear 15d is set to be an angle by which the worm gear 15d is rotated by the rotation of the worm wheel 15e (within a range from 13 to 20 degrees, here the angle is 15.4 degrees).

A radius of a pitch circle of the arc internal gear 15a is set to be substantially similar to a curvature radius of the arc of the arc guide rail 13. A center point of the pitch circle of the arc internal gear 15a is arranged on the horizontal line C passing through the center point 13e of the arc of the arc guide rail 13. Thereby, the arc internal gear 15a can be arranged along the arc of the arc guide rail 13, and a gear ratio of the arc internal gear 15a relative to the drive gear 15j can be relatively increased. Consequently, drive force given to the drive gear 15j can be decreased, and thus friction force between the arc internal gear 15a and the drive gear 15j can be reduced. Therefore, it is possible to turn the arc guide rail 13 efficiently.

According to this configuration, in this electric drive mechanism 15, the worm gear 15d, the first to fourth relay gears 15f, 15g, 15h and 15i and the drive gear 15j are rotated in this order by drive of the second electric motor 15c. By this rotation, the drive gear 15j is rolled on the arc internal gear 15a forward or backward. By this rolling, the arc guide rail 13 and the mounting and fixing portion 11 are turned around the horizontal line C.

Next, an operation of this display device turning base 1 will be described. In a case where the thin-screen display device 2 is turned forward (backward), the second electric motor 15c is driven and rotated in the one (opposite) direction so as to turn the arc guide rail 13 backward (forward) around the horizontal line C. Thereby, the mounting and fixing portion 11 is turned backward (forward) around the horizontal line C, and thus the thin-screen display device 2 mounted and fixed to the mounting and fixing portion 11 is turned forward (backward) around the horizontal line C.

In a case where the thin-screen display device 2 is turned leftward (rightward), the first electric motor is driven and rotated in the one (opposite) direction so as to roll the gear installed in a rotation axis of the first electric motor on the arc rack installed in the platform base 3 in the one (opposite) direction and horizontally rotate the rotating base 5 in the counterclockwise direction (clockwise direction) relative to the platform base 3. Thereby, the thin-screen display device 2 is turned leftward (rightward).

According to the display device turning base 1 configured as above, the arc guide rail 13 is supported by the support rollers 9 turnably around the horizontal line C in a state that the center point 13e of the arc 13d is arranged on the horizontal line C passing through the gravity center of the thin-screen display device 2 mounted and fixed to the mounting and fixing portion 11 and extending in the left and right direction. Therefore, the thin-screen display device 2 can be turned backward and forward in a state that the gravity center position of the thin-screen display device 2 mounted and fixed to the mounting and fixing portion 11 is fixed. Thereby, it is possible to stabilize and turn the thin-screen display device 2 backward and forward.

The arc guide rail 13 is turned around the horizontal line C by the electric drive mechanism 15 so as to turn the mounting and fixing portion 11 backward and forward. Therefore, the thin-screen display device 2 mounted and fixed to the mounting and fixing portion 11 is electrically stabilized and turned backward and forward.

Since the arc guide rail 13 is supported by the support rollers 9, it is possible to turn the arc guide rail 13 smoothly with a small force.

The arc guide rail 13 has the arc upper side portion 13a, the arc lower side portion 13b, a pair of the coupling portions 13c for coupling both the ends of the side portions 13a and 13b, and the support rollers 9 are arranged between the side portions 13a and 13b. Therefore, it is possible to prevent the support rollers 9 from dropping off and perform guidance with a simple structure.

The worm gear 15d is rotatable by the rotation of the worm wheel 15e. Therefore, the thin-screen display device 2 mounted and fixed to the mounting and fixing portion 11 can be turned backward and forward not only by the drive of the second electric motor 15c but also by hand.

Since the arc internal gear 15a is used, the gear box 15b can be small-sized.

Since the platform base (a second base portion) 3 for supporting the rotating base (the first base portion) 5 horizontally rotatably is provided, the thin-screen display device 2 can be rotated not only backward and forward but also in the horizontal direction.

Second Embodiment

A modified example of the arc guide rail 13 and the standing portion 7 of the first embodiment will be described in this embodiment.

Figure 13:
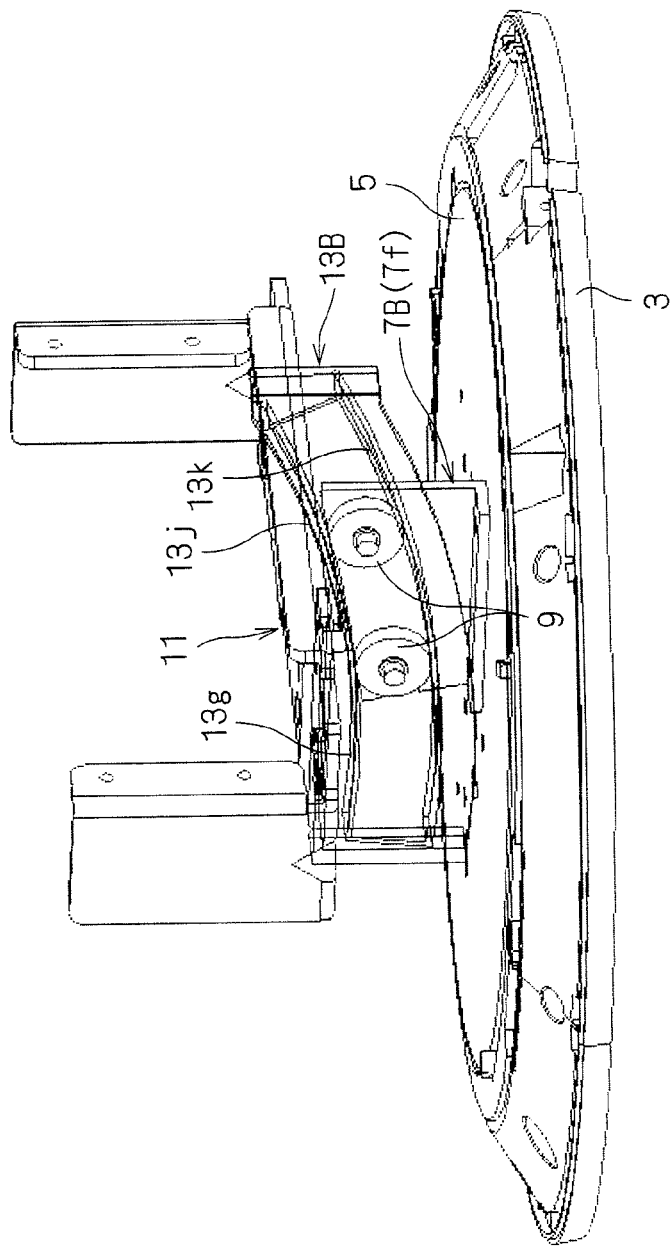
FIG. 13 is a view illustrating an assembling state between an arc guide rail 13B and a standing portion 7B of a display device turning base 1B according to a second embodiment.
Figure 14:
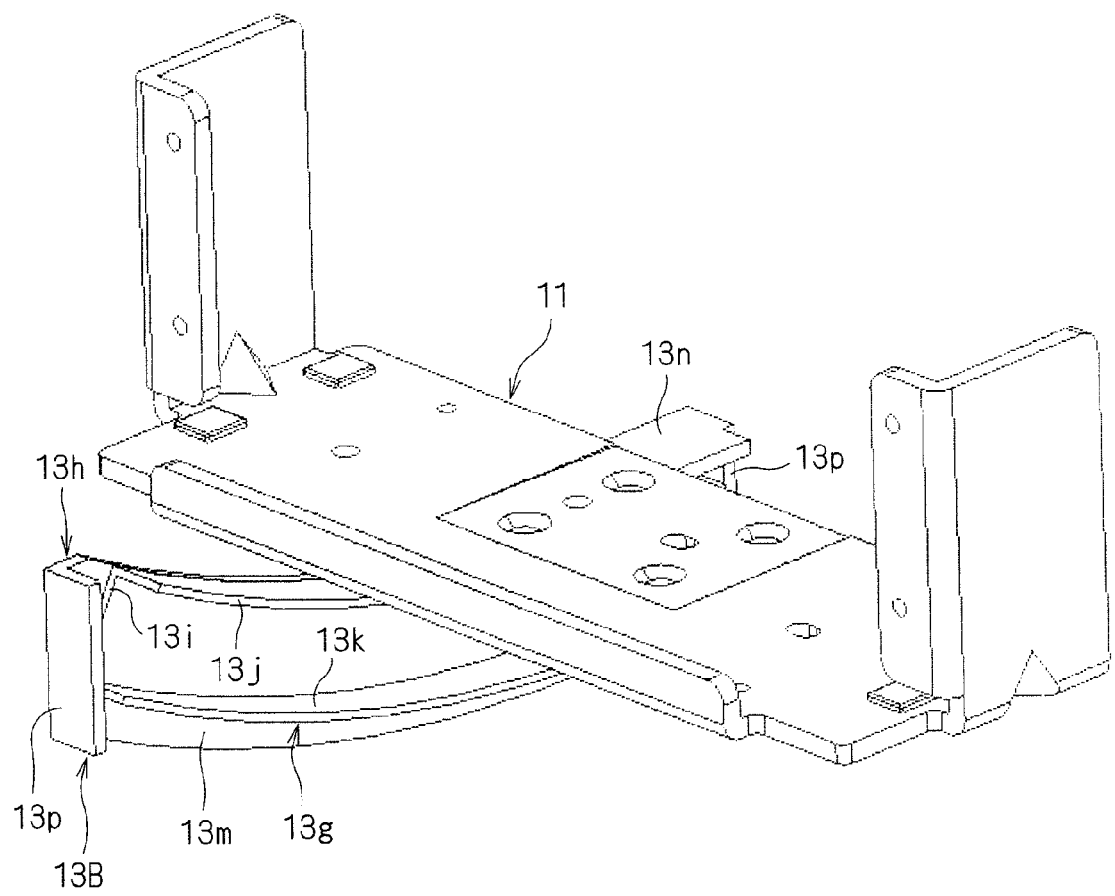
FIG. 14 is a partially perspective view of the side of the mounting and fixing portion 11 in FIG. 13.
Figure 15:
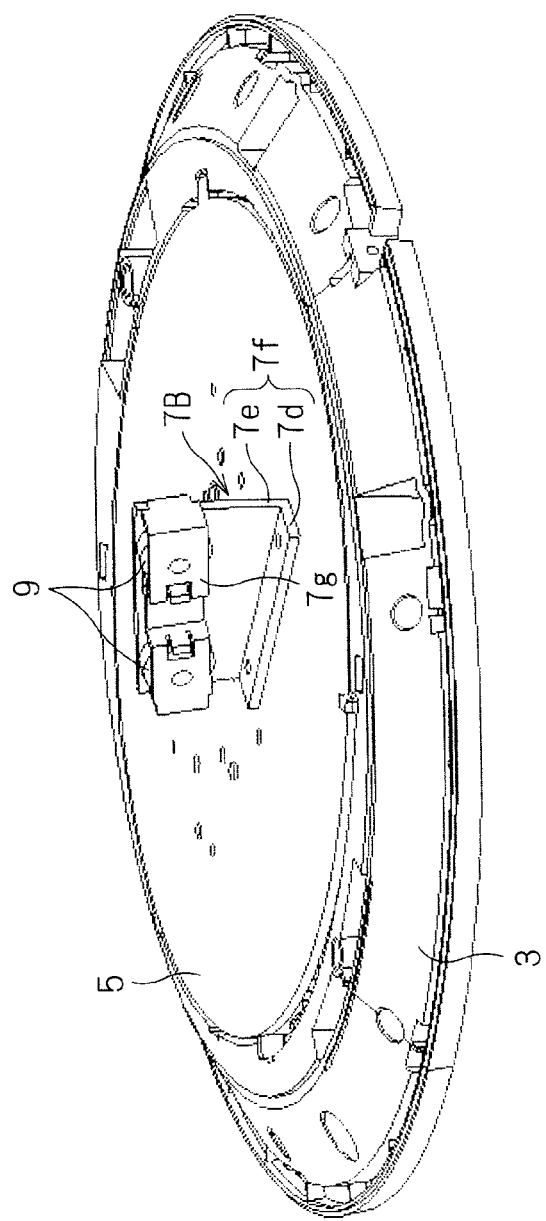
FIG. 15 is a partially perspective view of the side of the platform base 3 in FIG. 13.

As shown in FIGS. 13 to 15, an arc guide rail 13B in this embodiment is formed by an arc guide rail main body 13g, and a fixing member 13h for fixing the arc guide rail main body 13g to the mounting and fixing portion 11.

A section along a curvature radius of an arc of the arc guide rail main body 13g is formed into a U shape. In other words, the arc guide rail main body 13g has a rectangular plate side surface portion 13i with a long side curved in an arc shape. An upper surface portion 13j in a flat plate shape is extended in an upper side of the side surface portion 13i so as to laterally protrude, and a lower surface portion 13k in a flat plate shape is extended in a lower side of the side surface portion 13i so as to laterally protrude.

The fixing member 13h has a first fixing portion 13m to which the side surface portion 13i of the arc guide rail main body 13g is fixed on an inner surface thereof for example. A second fixing portion 13n for fixing the mounting and fixing portion 11 is extended in an upper side of the first fixing portion 13m, and stoppers 13p for preventing the support rollers 9 from dropping off are extended in both ends of the first fixing portion 13m.

It should be noted that although only one arc guide rail 13B is shown in FIGS. 13 to 15 for convenience sake, a pair of left and right arc guide rails 13B is symmetrically installed in the lower surface of the mounting and fixing portion 11 similar to the first embodiment.

As in FIG. 15, a standing portion 7B in this embodiment is provided with a standing portion main body 7f with a L-shaped section formed by a bottom plate portion 7d and a perpendicular flat plate portion 7e which is perpendicular to the bottom plate portion 7d, and a retaining member 7g installed in an outer surface of the perpendicular flat plate portion 7e for retaining the support rollers 9 rotatably around the horizontal axes between the retaining member 7g and the perpendicular flat plate portion 7e. Although only one standing portion 7B is shown in FIGS. 13 to 15 for convenience sake, a pair of left and right standing portions 7B is symmetrically installed on the rotating base 5 similar to the first embodiment.

As shown in FIG. 13, the support rollers 9 of one standing portion 7B are arranged between the surface portions 13j and 13k of one arc guide rail 13B so as to move along the surface portions 13j and 13k. The support rollers 9 of the other standing portion 7B are arranged between the surface portions 13j and 13k of the other arc guide rail 13B so as to move along the surface portions 13j and 13k.

According to this configuration, as well as the first embodiment, the arc guide rail 13B is supported by the support rollers 9 turnably around the horizontal line C installed in the standing portion 7B in a state that a center point of the arc thereof is arranged on the horizontal line C passing through the gravity center of the thin-screen display device 2 mounted and fixed to the mounting and fixing portion 11 and extending in the left and right direction.

According to a display device turning base 1B configured as above, the section along the curvature radius of the arc of the arc guide rail 13B is formed into a U shape. Therefore, it is possible to ensure strength of the arc guide rail 13B, thereby decrease height of the arc guide rail 13B without deteriorating the strength of the arc guide rail 13B and decrease a spacing between the mounting and fixing portion 11 and the rotating base (the first base portion) 5.

Since the support rollers 9 are arranged inside the U shape of the arc guide rail 13B, the arc guide rail 13B and the support rollers 9 are easily assembled.

Third Embodiment

This third embodiment is configured by further providing a neutral position detecting unit 17 for detecting a neutral position of backward and forward turn of the mounting and fixing position 11 in the first or second embodiment.

Figure 16:
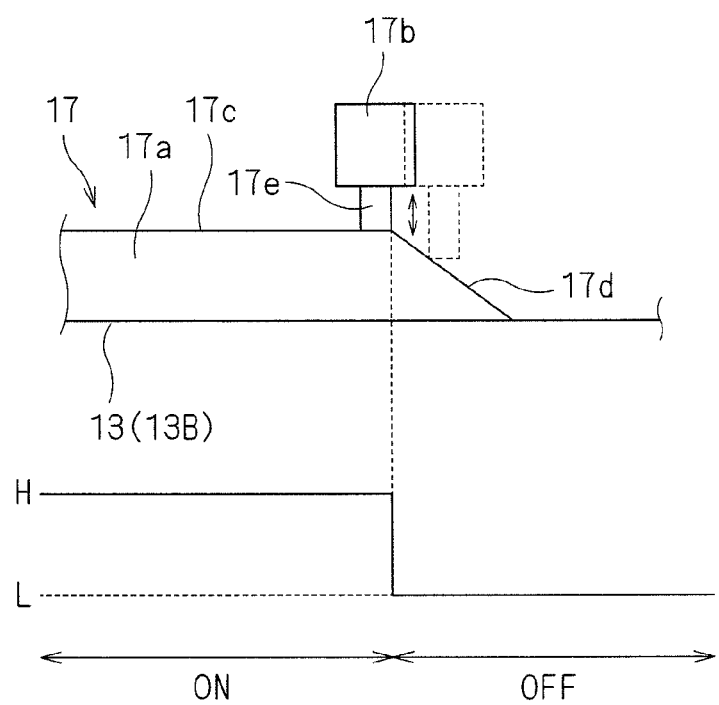
FIG. 16 is a view illustrating a configuration of a neutral position detecting unit 17 of a display device turning base 1C according to a third embodiment.

As in FIG. 16 for example, the neutral position detecting unit 17 is provided with a pressing protruding strip portion 17a installed in a side surface or a lower surface of the arc guide rail 13 or 13B, and a self-recovery type pushing button switch 17b installed on the rotating base 5 and turned ON/OFF by pressing with an upper end surface 17c of the pressing protruding strip portion 17a.

The pressing protruding strip portion 17a is formed to be one line at a constant height along the arc direction of the arc guide rail 13 or 13B. One end side thereof is a sloping surface 17d which is gradually lowered.

This pressing protruding strip portion 17a is turned backward and forward in accordance with the backward and forward turn of the arc guide rail 13 or 13B. By this turn, the pushing button switch 17b is turned ON by raising a pushing button portion 17e through the sloping surface 17d of the pressing protruding strip portion 17a and pressing the pushing button portion 17e with the upper end surface 17c. The pushing button switch 17b is turned OFF by lowering the pushing button portion 17e through the sloping surface 17d of the pressing protruding strip portion 17a and releasing the pressing of the upper end surface 17c.

Here, in a state that the arc guide rail 13 or 13B is turned forward (in other words, the mounting and fixing portion 11 is turned forward), the pushing button switch 17b is turned ON for example. Meanwhile, in a state that the arc guide rail 13 or 13B is turned backward, the pushing button switch 17b is turned OFF for example.

In other words, the neutral position of the backward and forward turn of the mounting and fixing portion 11 is detected by switching between ON and OFF of the pushing button switch 17b. A forward turn state of the mounting and fixing portion 11 is detected from an ON state of the pushing button switch 17b, and a backward turn state of the mounting and fixing portion 11 is detected from an OFF state of the pushing button switch 17b.

Since a display device turning base 1C configured as above is provided with the neutral position detecting unit for detecting the neutral position of the backward and forward turn of the mounting and fixing portion 11, the neutral position of the backward and forward turn of the mounting and fixing portion 11 can be detected. By controlling the second electric motor 15c using the detection result, it is possible to return a turn position of the mounting and fixing portion 11 to the neutral position at the time of power ON and OFF or at any time.

The neutral position detecting unit 17 is provided with the pressing protruding strip portion 17a installed in the arc guide rail 13 or 13B along the arc direction of the arc guide rail 13 or 13B, and the self-recovery type pushing button switch 17b turned ON/OFF by pressing with the upper end surface 17c of the pressing protruding strip portion 17a. Therefore, it is possible to detect not only the neutral position of the backward and forward turn of the mounting and fixing portion 11 but also the forward turn state or the backward turn state from the neutral position of the mounting and fixing portion 11.

Fourth Embodiment

This embodiment is configured by further providing an electric elevating mechanism 19 for elevating the platform base (the second base portion) 3 in any of the first to third embodiments.

Figure 17:
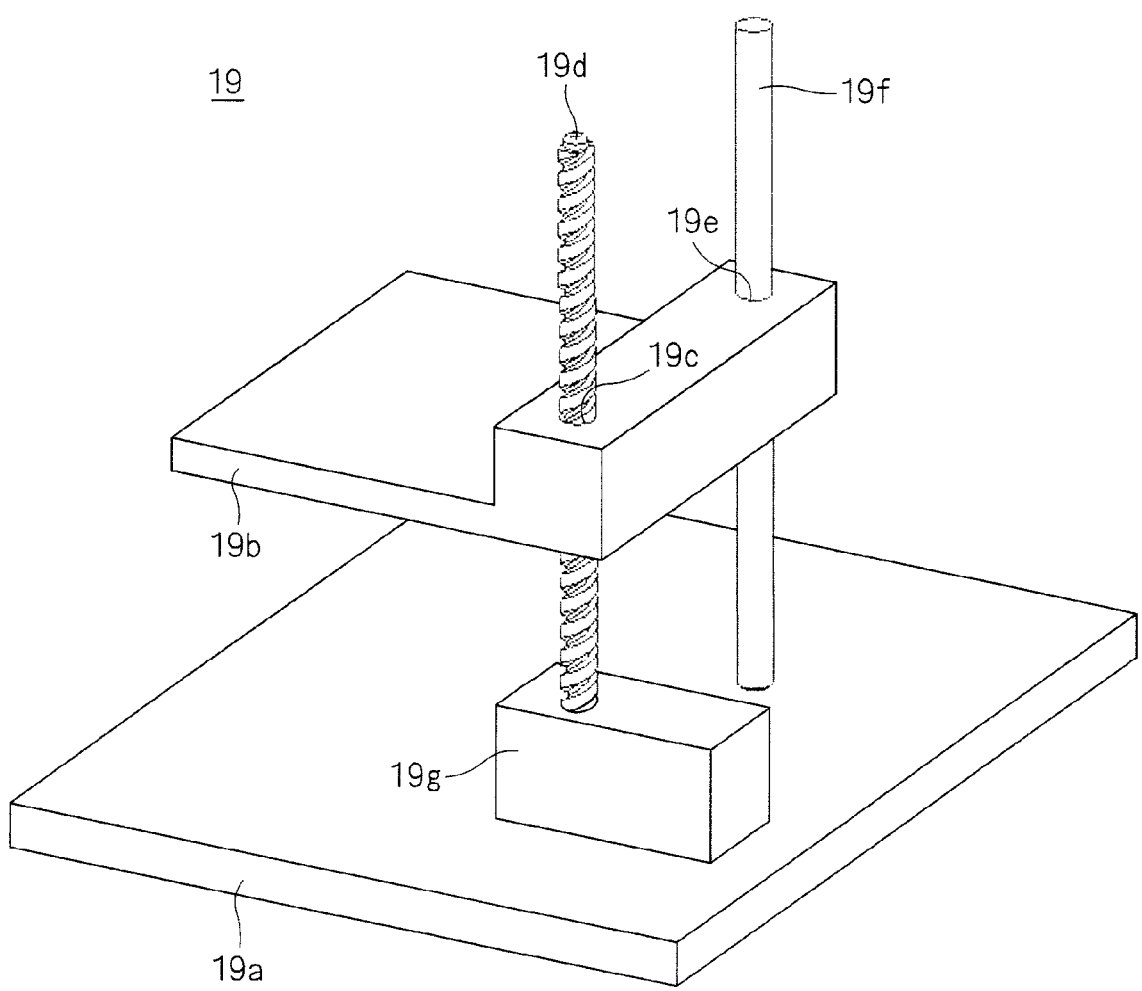
FIG. 17 is a schematic configuration of an electric elevating mechanism 19 of a display device turning base 1D according to a fourth embodiment.

As shown in FIG. 17 for example, the electric elevating mechanism 19 is provided with a platform base (a third base portion) 19a, an elevating base 19b in which the platform base 3 is installed, a screw shaft 19d disposed on the platform base 19a in a standing manner rotatably around a center axis thereof and also inserted and screwed into a threaded hole 19c of the elevating base 19b, a guide shaft 19f disposed on the platform base 19a in a standing manner and also inserted into an insertion hole 19e of the elevating base 19b, and an electric drive unit 19g installed on the platform base 19a for rotating the screw shaft.

The elevating base 19b has an attachment surface 19h to which the platform base 3 is attached on an upper surface thereof, and is also provided with the threaded hole 19c passing through upper and lower surfaces thereof and the insertion hole 19e passing through the upper and lower surfaces. The threaded hole 19c has an inner peripheral surface which is threaded into a female screw so as to match with a male screw formed on an outer peripheral surface of the screw shaft 19d.

A position in the horizontal direction of the elevating base 19b is fixed by the screw shaft 19d and the guide shaft 19f. By rotation of the screw shaft 19d around a center axis thereof, the elevating base 19b is raised or lowered along the screw shaft 19d and the guide shaft 19f.

According to this configuration, when the electric drive unit 19g is driven so as to rotate the screw shaft 19d in the one direction, the elevating base 19b is raised in accordance with the rotation of the screw shaft 19d, and thereby the platform base 3 attached to the elevating base 19b is elevated so as to raise the thin-screen display device 2 mounted and fixed to the mounting and fixing portion 11. When the electric drive unit 19g is driven so as to rotate the screw shaft 19d in the opposite direction, the elevating base 19b is lowered in accordance with the rotation of the screw shaft 19d, and thereby the platform base 3 attached to the elevating base 19b is lowered so as to lower the thin-screen display device 2 mounted and fixed to the mounting and fixing portion 11.

Since a display device turning base ID configured as above is provided with the electric elevating mechanism 19 for elevating the platform base (the second base portion) 3, it is possible to turn the thin-screen display device 2 not only backward and forward but also up and down.

Since the electric elevating mechanism 19 is formed by the platform base 19a, the elevating base 19b, the screw shaft 19d and the guide shaft 19f, the electric elevating mechanism 19 can be formed by a simple mechanism.

While the invention has been shown and described in detail, the foregoing description is in all aspects illustrative and not restrictive. It is therefore understood that numerous modifications and variations can be devised without departing from the scope of the invention.

What is claimed is:

1. A display device turning base comprising:
a first base portion;
a mounting and fixing portion including perpendicular plate portions for positioning the right and left ends of a display device mounted and fixed to the mounting and fixing portion;

a pair of left and right arc guide rails attached to a lower surface of said mounting and fixing portion, each arc guide rail having an circular arc shaped portion;

a support roller that turnably supports said pair of arc guide rails, the support roller rotatably installed in a standing portion attached to said first base portion; and an electric drive mechanism for moving said mounting and fixing portion backward and forward along an arc formed by said arc guide rails, wherein the circular arc shaped portions of the pair of left and right guides rails are convex with respect to the first base portion and concave with respect to the mounting and fixing portion.

2. The display device turning base according to claim 1, wherein each of said pair of arc guide rails has an arc upper side portion, an arc lower side portion and a pair of coupling portions for coupling both ends of the side portions in such a manner that the side portions are arranged in parallel spaced apart from each other, and said support roller is arranged between the side portions.

3. The display device turning base according to claim 1, wherein said electric drive mechanism comprises:

an arc internal gear installed on said first base portion; and a gear box installed in said mounting and fixing portion, said gear box comprises:

an electric motor;

a worm gear installed in a rotation axis of said electric motor;

a worm wheel meshed with said worm gear; and a drive gear meshed with said arc internal gear and rotated by rotation of said worm wheel, and said worm gear is rotatable by the rotation of said worm wheel.

4. The display device turning base according to claim 3, wherein a radius of a pitch circle of said arc internal gear is set to be substantially similar to a curvature radius of the arc of said arc guide rail, and a center point of the pitch circle of said arc internal gear is arranged on said horizontal line passing through the center point of the arc of said arc guide rail.

5. The display device turning base according to claim 1, further comprising a second base portion that supports said first base portion such that said first base portion rotatable around an axis perpendicular with respect to the second base portion.

* * * * *